United States Patent [19]

Iwai

[11] Patent Number: 4,922,340
[45] Date of Patent: May 1, 1990

[54] METHOD AND AN APPARATUS OF COMPRESSING INFORMATION CONTENT OF MULTILEVEL DIGITAL IMAGE DATA

[75] Inventor: Kiyoshi Iwai, Tokyo, Japan

[73] Assignee: Nippon Board Computer Co., Ltd., Tokyo, Japan

[21] Appl. No.: 293,884

[22] Filed: Jan. 3, 1989

[51] Int. Cl.⁵ .................... H04N 1/41; H04N 7/13
[52] U.S. Cl. .................... 358/135; 358/455; 375/27
[58] Field of Search ............... 358/135, 136, 133, 455; 375/27, 25

[56] References Cited

U.S. PATENT DOCUMENTS

| | | | |
|---|---|---|---|
| 2,949,505 | 8/1960 | Kretzmer | 375/25 |
| 3,403,226 | 9/1968 | Wintringham | 358/135 |
| 3,439,753 | 4/1969 | Mounts | 375/27 |
| 4,258,394 | 3/1981 | Kennedy | 358/455 |
| 4,369,464 | 1/1983 | Temime | 358/136 |
| 4,533,957 | 8/1985 | Iinuma | 358/455 |
| 4,771,331 | 9/1988 | Bierling | 358/136 |
| 4,785,356 | 11/1988 | Gonzales | 358/135 |
| 4,797,944 | 1/1989 | Tanaka | 358/136 |

*Primary Examiner*—Howard W. Britton
*Attorney, Agent, or Firm*—Pearne, Gordon, McCoy & Granger

[57] ABSTRACT

A method and an apparatus of compressing information content of multilevel digital image data having multilevel gradation value P (i, j) of each picture cell comprising means to determine an occurence frequency of individual gradation value from each gradation value P (i, j) in a predetermined image unit or to determine a difference value f(i, j) between gradation values of adjacent picture cells from multilevel image data of a predetermined image component as well as determining an occurrence frequency of individual difference values from the determined difference values f(i, j) in the image and means to code each multilevel gradation value P (i, j) or difference value f(i, j) by assigning a code having a lower bit number as the gradation or difference value has a higher occurrence frequency.

1 Claim, 2 Drawing Sheets

METHOD AND AN APPARATUS OF COMPRESSING INFORMATION CONTENT OF MULTILEVEL DIGITAL IMAGE DATA

BACKGROUND OF THE INVENTION

In general, in case a frame of image is resolved into M×N picture cells, to each of which a quantitizing code of m bits is assigned, the maximum information content of the image becomes M×N×m bits. Supposed that m is 6 bits ($2^6=64$ levels), a frame of image is supposed to have the information content of 256 dots×256 dots×6 bits (=393216 bits).

Meanwhile, many images actually treated have offset gradation values rather than those of equal probability. Thus, it will be noted that the information content required for expressing a frame of image will be considerably less than M×N×m bits. The difference between the maximum information content and the actual information content is called redundancy and the deletion of the redundancy corresponds to the compression of the image data.

From the aforementioned view point, there have been conventionally proposed various methods of compressing the image data, all of which have a fundamental idea of Run-Length with which Huffman coding method is combined.

Such a conventional method of compressing image data will be described hereinjustbelow.

A series of identical signals on a scanning line are generally called Run and the length of Run is called Run-Length. Supposed that an occurence probability of a certain Run-Length is Q (i) and that the following expression is established for each Q(i);

$$Q(1) \geq Q(2) \geq Q(3) \geq \cdots \geq Q(n)$$

At that time, each Q (i) has a given code and a code length L (i) is determined as follows;

$$L(1) \leq L(2) \leq L(3) \leq \cdots \leq L(n)$$

It will be noted that such a coding process can shorten the codes corresponding to Run-Lengths as they occur with higher probability.

As an example, supposed that the occurrence probabilities Q (i) of the Run-Lengths a1 through a4 on TABLE I are 0.4, 0.3, 0.2, 0.1, respectively, a coding process can be accomplished as shown on TABLE II. Such a coding process is called Huffman shortest coding method.

TABLE I

| ai | a1 | a2 | a3 | a4 |
| --- | --- | --- | --- | --- |
| Q(i) | 0.4 | 0.3 | 0.2 | 0.1 |

TABLE II

| ai | I | II | III | Code | L (i) |
| --- | --- | --- | --- | --- | --- |
| a1 0.4 | 0.4 | 0.6→0 →1.0 0.4→1 | | 1 | 1 |
| a2 0.3 | 0.3→0 0.3→1 | | | 01 | 2 |
| a3 0.2→0 | | | | 000 | 3 |
| a4 0.1→1 | | | | 001 | 3 |

As noted from TABLE II, a code of 1 bit is assigned to the Run-Length a1 of highest occurrence probability while codes of 3 bits are assigned to the Run-Lengths a3 and a4 of lower occurrence probability and it will be noted from this that the information contents are compressed as a whole.

The aforementioned information compression method has been generally used for compressing such image data as two value facsimile signals having simple white and black colors because it effectively functions for them. However, it cannot function effectively for compression of such image data for picture cells of multilevel gradation values. For example, in case television images are transmitted while they are digitized, gradation informations of m bits are applied to the digitized information. The Run-Length is never elongated as in the two value informations (which corresponds to m=1) due to variation in the gradation information. Thus, it will be noted that the conventional method has no effect of compression of multilevel gradation image data.

SUMMARY OF THE INVENTION

Accordingly, it is a principal object of the invention to provide a method of effectively compressing multilevel gradation image data such as television image data.

In accordance with an aspect of the invention, there is provided a method of compressing multilevel image data having picture cells of multilevel gradation values P (i, j), characterized by comprising the steps of determining an occurrence frequency of individual gradation values from each gradation values P (i, j) in a predetermined image unit and assigning codes of less bit number as said gradation values have higher occurrence frequency whereby each gradation value P (i, j) is coded.

The applicant developed a color image digitizer board having an image memory attached thereto as disclosed by Japanese Utility Model Application Nos. 33,329/1986, 33,330/1986 and 36,184/1986). The board can analyze many multilevel gradation image data such as image data of 6 bits (64 gradation levels) and 8 bits 256 gradation levels), for example. As a result, the multilevel gradation image data have the following characteristics; The multilevel gradation image data have no adjacent picture cells considerably different from each other, but adjacent picture cell groups ($S_1, S_2, S_3 \cdots S_n$) having substantially identical gradation levels as shown in FIG. 2. Therefore, it will be understood that a series of picture cells have an identical gradation level in succession because one gradation group has substantially identical gradation levels.

It is supposed that an image of M×N dots has a gradation of m bits attached to each dot as shown in FIG.

3 and that a voluntary picture cell (i, j) has a gradation value of P (i, j).

Since the gradation number of m bits is $2^m$, P (i, j) has the maximum value of $2^m$. However, since the adjacent picture cells actually have many identical values P (i, j) as aforementioned, the image data can be effectively compressed by determining an occurrence frequency of individual gradation value from each P (i, j) in the image and assigning a code of less bit number as the gradation value has higher occurrence frequency whereby the gradation value P (i, j) is coded.

The compressed original image can be decoded by determining the gradation value P (i, j) of each picture cell from the relation of the gradation values and the codes which is predetermined for the image.

The determination of occurrence frequency of the gradation value and the coding of P (i, j) are carried out for one unit of a frame of image as a principle, but in case that the image transmission and the image storage are carried out for a plurality of image units or for a unit of less than a frame of image, such processes can be practiced for the unit or units.

In accordance with another aspect of the invention, there is provided a method of compressing multilevel image data having picture cells of multilevel gradation values P (i, j), characterized by comprising the steps of determining a difference value f (i, j) between gradation values of adjacent picture cells from the multilevel gradation image data of a predetermined image component as well as determining a frequency of individual difference values from the determined difference values f (i, j) in the image component and assigning codes of less bit number as said difference values have higher occurrence frequency whereby each difference value f (i, j) is coded.

In accordance with further aspect of the invention, there is provided an apparatus of compressing multilevel image data having picture cells of multilevel gradation values, characterized by comprising;

means to determine a difference value between gradation values of adjacent picture cells from the input multilevel gradation image data of a predetermined image component;

means to store said determined difference values sequentially; means to count an occurrence frequency of individual difference values form the determined difference values in the image component;

means to arrange the difference values in order of the occurrence frequency and assign codes of less bit number as said difference values have higher occurrence frequency whereby a code corresponding to the difference value is prepared;

and means to convert the difference value into a code by sequentially reading out the difference values from said storage means.

As aformentioned, the multilevel gradation image data have no adjacent picture cells considerably different from each other, but adjacent picture cell groups ($S_1$, $S_2$, $S_3$ - - - $S_n$) having substantially identical gradation levels as shown in FIG. 2. Therefore, the difference values between the the gradation values of the adjacent picture cells are collected adjacent to 0 value because the picture cells of one gradation group Si have substantially identical gradation values.

If an image of M×N dots has a gradation of m bits attached to each dot as shown in FIG. 3 and that each picture cell (i, j) has a gradation value of P (i, j) while a difference value between the gradation values of the adjacent picture cells is f (i, j), then the difference value is; $f(i, j) = P(i, j) - P(i-1, j)$ - - - in case of the picture cells arranged in the direction of i, or $f(i, j) = P(i, j) - P(i, j-1)$ - - - in case of the picture cells arranged in the direction of j. The values of f (i, j) become 0 or adjacent to 0 such as ±1 or ±2, etc.

Since the gradation number of m bits is $2^m$, f (i, j) has the maximum value of $(2^m - 1)$. However, since all of the values f (i, j) are 0 or adjacent to 0, adjacent picture cells actually have many identical values P (i, j) as aforementioned, the image data can be effectively compressed by determining all of f (i, j) for the image as well as determining an occurrence frequency of individual difference values from each of the determined difference values in the image and assigning a code of a smaller bit number as the difference value has higher occurrence frequency whereby each difference value f (i, j) is coded.

The compressed original image can be decoded by determining the gradation values P (i, j) of each picture cells by sequentially converting the codes back and adding the determined difference values f (i, j) because the original gradation value P (0, 0) is known.

The determination of difference value f (i, j), occurrence frequency of the difference value and the coding of f (i, j) are carried out for one unit of a frame of image as a principle, but in case that the image transmission and the image storage are carried out for a plurality of image units or for a unit of less than a frame of image, such processes can be practiced for the unit or units.

In accordance with a further aspect of the invention, there is provided a method of compressing multilevel image data having picture cells of multilevel gradation values P (i, j), characterized by comprising the steps of determining n gradation difference values $f_n$ (i, j) (n≥2) between gradation values of successive two picture cells in a predetermined image unit as well as determining an occurrence frequency of individual n gradation difference values form the determined n gradation difference values $f_n$ (i, j) and assigning codes of less bit number as said n gradation difference values $f_n$ (i, j) have higher occurrence frequency whereby each n gradation difference value $f_n$ (i, j) is coded.

As aformentioned, the multilevel gradation image data have no adjacent picture cells considerably different from each other, but adjacent picture cell groups ($S_1$, $S_2$, $S_3$ - - - $S_n$) having substantially identical gradation levels as shown in FIG. 2. Therefore, many difference values between the the gradation values of the successive picture cells are of lower value. After the difference values are determined, there are further determined many much lower sub-difference values between the successive difference values.

It is supposed that the gradation on a certain scanning line is as follows;

P (0, 0), P (1, 0), P (2, 0) - - - P (i, 0) - - -

One gradation difference value corresponding to this is defined as follows;

$$P(0, 0) - 0 = f_1(0, 0)$$
$$\{P(1, 0) - P(0, 0)\} = f_1(1, 0)$$
$$\{P(2, 0) - P(1, 0)\} = f_1(2, 0)$$

$$\{P(i, 0) - P(i - 1, 0)\} = f_1(i, 0)$$

Two gradation difference values are as follows;

$$f_1(0, 0) - 0 = f_2(0, 0)$$
$$\{f_1(1, 0) - f_1(0, 0)\} = f_2(1, 0)$$
$$\{f_1(2, 0) - f_1(1, 0)\} = f_2(2, 0)$$

$$\{f_1(i, 0) - f_1(i - 1, 0)\} = f_2(i, 0)$$

Thus, n gradation difference values are as follows;

$$f_{n-1}(0, 0) - 0 = f_n(0, 0)$$
$$\{f_{n-1}(1, 0) - f_{n-1}(0, 0)\} = f_n(1, 0)$$
$$\{f_{n-1}(2, 0) - f_{n-1}(1, 0)\} = f_n(2, 0)$$

$$\{f_{n-1}(i, 0) - f_{n-1}(i - 1, 0)\} = f_n(i, 0)$$

In general, suppose that the gradation value in the picture cell (i, j) is P (i, j) and that the difference value between the gradation level values of the successive two picture cells is $f_1$ (i, j), $f_1$ (i, j) corresponds to one gradation difference value of P (i, j) and the following expressions are established;
$f_1(0, 0) = P(0, 0)$
$f_1(i, j) = P(i, j) - P(i - 1, j)$ Also, suppose that the difference values between the successive values of $f_1$ (i, j) is $f_2$ (i, j), $f_2$ (i, j) correspond to two gradation difference value of P (i, j) and the following expressions are established;
$f_2(0, 0) = P(0, 0)$
$f_2(i, j) = f_1(i, j) - f_1(i-1, j)$ In general, the n gradation difference values of P (i, j) are as follows;
$f_n(0, 0) = P(0, 0)$
$f_n(i, j) = f_{n-1}(i, j) - f_{n-1}(i-1, j)$ Thus, appropriate n gradation difference value $f_n$ (i, j) is calculated and then the n gradation difference value $f_n$ (i, j) can be coded by calculating the occurrence frequency of each difference value and further assigning codes of a smaller bit number as the n gradation difference values have higher occurrence frequency.

In case that n gradation difference values such as one gradation difference values, two gradation difference values and the like are sequentially determined and that the information content when they are coded is t (n), the appropriate value n can be determined by finding the value of n so that the following expression is established;

$$t(n-1) > t(n) < t(n+1)$$

The thus compressed information can be decoded into the original image as follows;

$$P(0, 0) + f_n(1, 0) = f_{n-1}(1, 0)$$
$$P(0, 0) + f_n(1, 0) + f_n(2, 0) = f_{n-1}(2, 0)$$

Also, the following decoding processes are carried out;

$$P(0, 0) + f_{n-1}(1, 0) = f_{n-2}(1, 0)$$
$$P(0, 0) + f_{n-1}(1, 0) + f_{n-2}(2, 0) = f_{n-2}(2, 0)$$

Finally, the following decoding processes are carried out;

$$P(0, 0) + f_1(1, 0) = P(1, 0)$$
$$P(0, 0) + f_1(1, 0) + f_1(2, 0) = P(2, 0)$$

Thus, it will be noted that the original image can be restored.

The determination of difference value $f_n$ (i, j), occurrence frequency of the difference value and the coding of $f_n$ (i, j) are carried out for one unit of a frame of image as a principle, but in case that the image transmission and the image storage are carried out for a plurality of image units or for a unit of less than a frame of image, such processes can be practiced for the unit or units.

Although the aforementioned features are described with respect to the white and black gradation image, they can be applied to a color gradation image by accomplishing the aforementioned processes for every picture cell of red (R), green (G) or blue (B) color.

BRIEF DESCRIPTION OF THE DRAWINGS

The above and other objects and features of the invention will be apparent from the description of the embodiments of the invention taken along with reference to the accompanying drawings in which.

DESCRIPTION OF THE EMBODIMENTS

Figure 1:
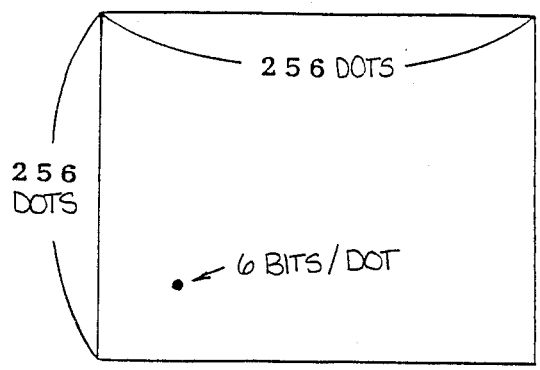
FIG. 1 illustrates information content of an image.
Figure 2:
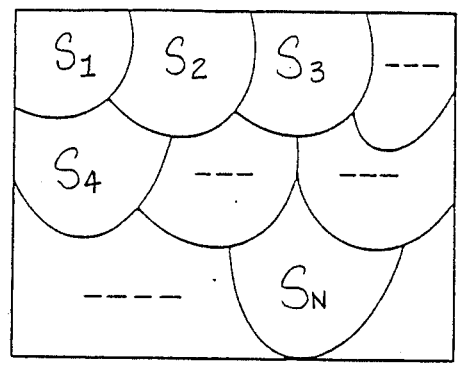
FIG. 2 illustrates a distribution of gradation levels in a single image.
Figure 3:
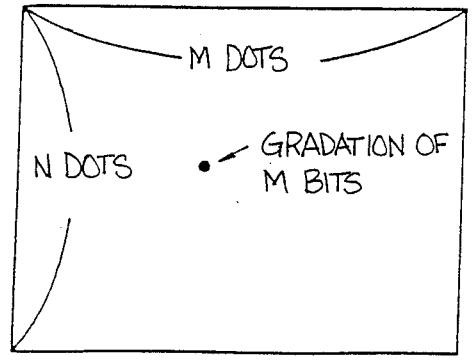
FIG. 3 illustrates a construction of an image.

One embodiment of the invention will be described hereinjustbelow.

TABLE III shows gradation levels of picture cell row obtained from one scanning line when an image is scanned.

TABLE III

| i | P (i, j) | Occurrence frequency |
|---|---|---|
| 1 | 0 | 1/13 |
| 2 | 1 | 1/13 |
| 3 | 2 | 2/13 |
| 4 | 2 | 2/13 |
| 5 | 3 | 1/13 |
| 6 | 16 | 3/13 |
| 7 | 16 | 3/13 |
| 8 | 16 | 3/13 |
| 9 | 5 | 1/13 |
| 10 | 7 | 1/13 |
| 11 | 60 | 2/13 |
| 12 | 60 | 2/13 |
| 13 | 62 | 1/13 |

TABLE IV shows a rearrangement of the gradation values P (i, j) in order of occurrence frequency.

TABLE IV

| P (i, j) | Occurrence frequency |
|---|---|
| 16 | 3/13 |
| 2 | 2/13 |
| 60 | 2/13 |
| 0 | 1/13 |
| 1 | 1/13 |
| 3 | 1/13 |
| 5 | 1/13 |
| 7 | 1/13 |
| 62 | 1/13 |

The gradation values P (i, j) are coded by assigning codes of shorter bit length as they have higher occurrence frequency. If the Huffman coding method is employed as means to code them, then the process will be carried out as shown in TABLE V and the obtained codes are as shown in TABLE VI.

TABLE VI

| P (i, j) | Code | Number of Figures |
|---|---|---|
| 16 | 10 | 2 |
| 2 | 010 | 3 |
| 60 | 011 | 3 |
| 0 | 110 | 3 |
| 1 | 111 | 3 |
| 3 | 0000 | 4 |
| 5 | 0001 | 4 |
| 7 | 0010 | 4 |
| 62 | 0011 | 4 |

The number of total bits in case of no compression of information content in the picture cell row on the TABLE III is 13×6 bits (=78 bits), but that in case of compression of information content is 2×3+3×2+3×2+3+3+4+4+4+4 (=40 bits). This means that the information content can be compressed into 40/78 (=0.51).

In this embodiment only one scanning line is described in order to simplify the explanation and since a frame of image has many scanning lines, an arrangement of codes corresponding to P (i, j) is extremely elongated. Therefore, if noises or the like enter into the codes during their transmission, the image cannot be accurately restored on a signal receiving section. In order to avoid it, a partition code is inserted between the scanning lines when the codes corresponding to P (i, j) are arranged in order of scanning the image so that the scanning lines have no error.

Furthermore, the gradation value of the first picture cell on every scanning line at its head effectively enters into the codes when the codes corresponding to the P (i, j) are arranged in order of scanning.

Next, will be described another embodiment of the invention hereinjustbelow.

TABLE VII shows the gradation values of the picture cell row obtained from the single scanning line when the image is scanned.

TABLE V

| P (i, j) | Occurrence frequency | | | | | | | |
|---|---|---|---|---|---|---|---|---|
| 16 | 3/13 | | | | | | 8/13—0 | →1 |
| | | | | | 4/13—0 | 5/13—1 | | |
| | | | | | 4/13—1 | | | |
| | | | | | 3/13—0 | | | |
| | | | | 2/13—1 | | | | |
| | | 2/13—0 | | | | | | |
| | | 2/13—1 | | | | | | |
| 2 | 2/13 | 2/13—0 | | | | | | |
| 60 | 2/13 | 2/13—1 | | | | | | |
| 0 | 1/13—0 | | | | | | | |
| 1 | 1/13—1 | | | | | | | |
| 3 | 1/13—0 | | | | | | | |
| 5 | 1/13—1 | | | | | | | |
| 7 | 1/13—0 | | | | | | | |
| 62 | 1/13—1 | | | | | | | |

TABLE VII

| i | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| P(i, j) | 8 | 9 | 10 | 10 | 15 | 16 | 17 | 17 | 30 | 31 | 32 | 32 | 47 | 48 | 48 | 49 | 60 | 60 | 61 | 61 | 62 |

Difference values f (i, j) between the gradation values of the successive two picture cells calculated from the gradation values P (i, j) on TABLE VII are as shown in

TABLE VIII

| i | P (i, j) | f (i, j) |
|---|---|---|
| 1 | 8 | 8 |
| 2 | 9 | 1 |
| 3 | 10 | 1 |
| 4 | 10 | 0 |
| 5 | 15 | 5 |
| 6 | 16 | 1 |
| 7 | 17 | 1 |
| 8 | 17 | 0 |
| 9 | 30 | 13 |
| 10 | 31 | 1 |
| 11 | 32 | 1 |
| 12 | 32 | 0 |
| 13 | 47 | 15 |
| 14 | 48 | 1 |
| 15 | 48 | 0 |
| 16 | 49 | 1 |
| 17 | 60 | 11 |
| 18 | 60 | 0 |
| 19 | 61 | 1 |
| 20 | 61 | 0 |
| 21 | 62 | 1 |

TABLE IX shows an arrangement of f (i, j) in order of occurrence number n of individual f (i, j) value and occurrence frequency n/T calculated.

TABLE IX

| f (i, j) | Occurrence number (n) | Occurrence frequency (n/T) | Occurrence order |
|---|---|---|---|
| 1 | 10 | 0.47 | 1 |
| 0 | 6 | 0.28 | 2 |
| 8 | 1 | 0.05 | 3 |
| 5 | 1 | 0.05 | 3 |
| 13 | 1 | 0.05 | 3 |
| 15 | 1 | 0.05 | 3 |
| 11 | 1 | 0.05 | 3 |
| Total | T = 21 | | |

The difference values f (i, j) are coded by assigning codes of shorter bit length as they have higher occurrence frequency. If the Huffman coding method is employed as means to code them, then the process will be carried out as shown in TABLE X.

TABLE X

| f (i, j) | Occurrence frequency | Code |
|---|---|---|
| 1 | 0.47 | 1 |
| 0 | 0.28 | 00 |
| 8 | 0.05 | 0101 |
| 5 | 0.05 | 0110 |
| 13 | 0.05 | 0111 |
| 15 | 0.05 | 01000 |
| 11 | 0.05 | 01001 |

The number of total bits in case of no compression of information content in the picture cell row on the TABLE III is 21×6 bits (=126 bits), but that in case of compression of information content that is conversion of f (i, j) into codes and arrangement thereof is 1 bit×10+2 bits×6+4 bits×1×3+5 bits×1×2 (=44 bits). This means that the information content can be compressed into 44/126 (=0.35).

In the embodiment is described only one scanning line in order to simplify the explanation and since a frame of image has many scanning lines, an arrangement of codes corresponding to f (i, j) is extremely elongated. Therefore, if noises or the like enter into the codes during their transmission, the image will not be able to be accurately restored on a signal receiving section. In order to avoid it, a partition code is inserted between the scanning lines when the values f (i, j) are converted into codes so that the scanning lines have no error. Furthermore, the gradation value of the first picture cell on every scanning line at its head effectively enters into the codes when the values f (i, j) are converted into codes.

Figure 4:
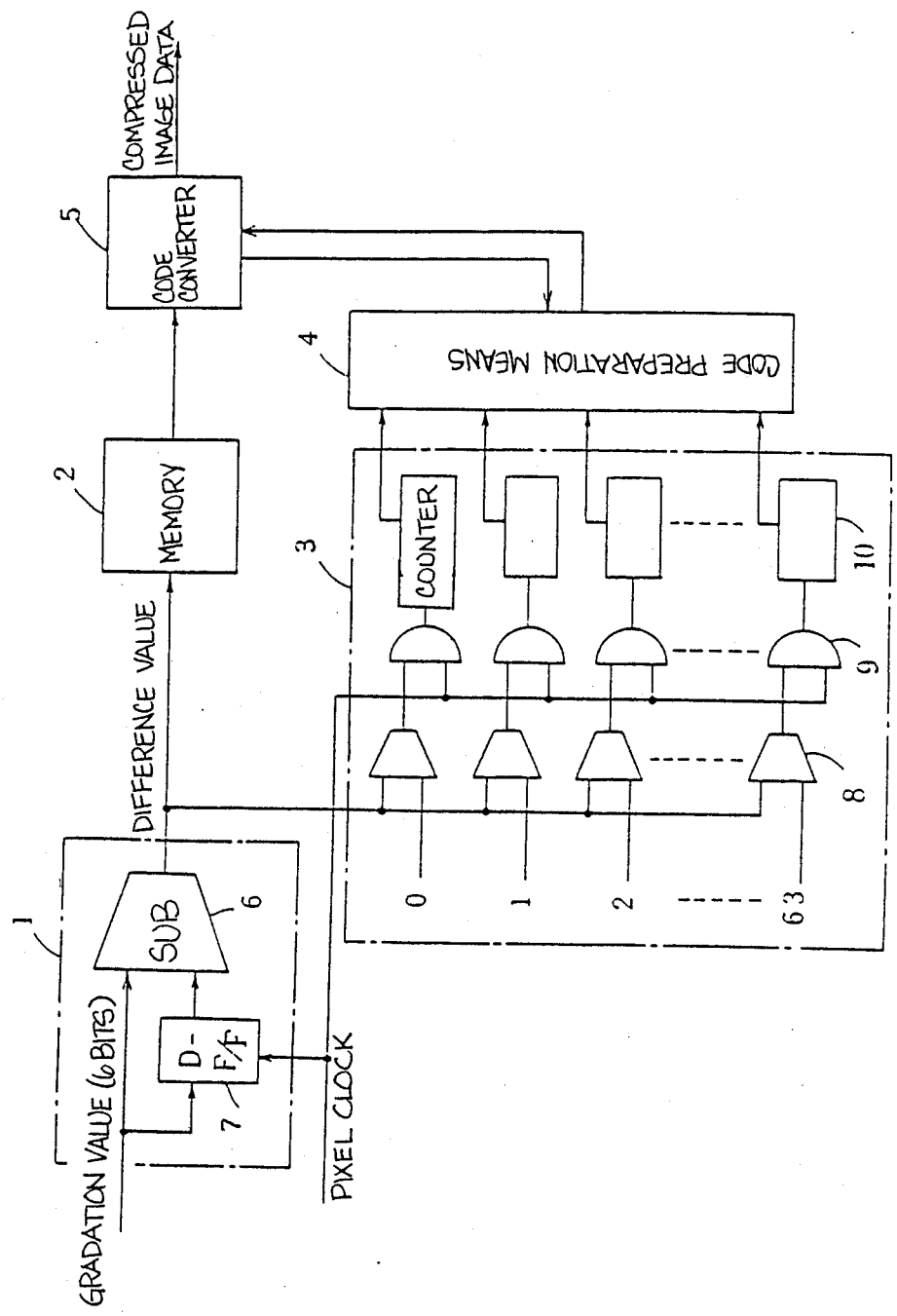
FIG. 4 is a block diagram of an apparatus of compressing an information content of multilevel gradation image data constructed in accordance with one embodiment of the invention.

An embodiment of an apparatus for carrying out the aforementioned methods is shown in FIG. 4.

The apparatus comprises a difference value operational device 1, a difference value memory 2, a counter 3 for counting occurrence number of the difference values, code preparation means 4 and difference/code converter 5.

To the difference value operational device 1 is input image data corresponding to a frame of image in order of scanning from a digitizer, not shown, for converting an analog image signal into a multilevel digital image signal or an image memory for storing the multilevel digital image data. Each picture cell of the image data has a multilevel gradation value of 6 bits (64 gradation levels), for example. The gradation values of the picture cells successively entering the operational device 1 are input to a subtractor 6 and also to a flip-flop 7. In the flip-flop is a gradation value of an immediately antecedent picture cell and as a gradation value of a next picture cell is input to the flip-flop 7, the gradation value of the antecedent picture cell is output to the subtractor 6. The subtractor 6 serves to subtract the gradation value of the antecedent picture cell from the newly input gradation value of the next picture cell into a difference value therebetween. In this manner, the subtractor 6 successively provides difference values between the gradation values of the adjacent picture cells. Since the gradation value of the first picture cell is output as it is because of no output from the flip-flop 7.

The thus obtained difference values are stored in the memory 2 and also input to the occurrence frequency counter 3.

The occurrence frequency counter 3 serves to examine which of 0 to 63 difference values determined by comparators 8 correspond to an add "1" to corresponding counters 10 through pixel clock gates 9, respectively. In this manner, an occurrence number of individual difference values is counted to determine the occurrence frequency therefor.

After the occurrence number of individual difference values for a frame of image is counted, the code preparation means 4 reads out the counted values from the respective counters 10, arranges the difference values in order of the occurrence frequency and assigns codes of smaller bit number as they have higher occurrence frequency in accordance with the Huffman coding method to prepare the codes corresponding to the difference values.

The difference value/code converter means 5 serves to sequentially read out the difference values from the memory and to sequentially convert the difference values into codes with reference to the relation of the prepared codes and the difference values.

Thus, the compressed image data can be obtained. The data may be transmitted to others or stored in an image memory.

The code preparation means 4 and the difference value/code converter means 5 may be composed of LSI or micro-computer.

Further embodiment of the invention will be described hereinjustbelow.

TABLE XI shows the gradation values of the picture cell row obtained from a single scanning line when the image is scanned.

TABLE XI

| i | 1 | 2 | 3 | 4 | 5 | 6 | 7 | 8 | 9 | 10 | 11 | 12 | 13 |
|---|---|---|---|---|---|---|---|---|---|----|----|----|----|
| P(i, j) | 0 | 1 | 3 | 5 | 8 | 12 | 16 | 20 | 25 | 32 | 40 | 48 | 57 |

After one gradation difference values $f_1(i, j)$ between the gradation values of the successive two picture cells are calculated from the gradation values $P(i, j)$ on TABLE XI, two gradation difference values $f_2(i, j)$ calculated from the one gradation difference values are as shown in TABLE XII.

TABLE XII

| i | P (i, j) | $f_1$ (i, j) | $f_2$ (i, j) |
|---|----------|--------------|--------------|
| 1 | 0 | 0 | 0 |
| 2 | 1 | 1 | 1 |
| 3 | 3 | 2 | 1 |
| 4 | 5 | 2 | 0 |
| 5 | 8 | 3 | 1 |
| 6 | 12 | 4 | 1 |
| 7 | 16 | 4 | 0 |
| 8 | 20 | 4 | 0 |
| 9 | 25 | 5 | 1 |
| 10 | 32 | 7 | 2 |
| 11 | 40 | 8 | 1 |
| 12 | 48 | 8 | 0 |
| 13 | 57 | 8 | 1 |

TABLE XIII shows an arrangement of $f_1(i, j)$ in order of occurrence number n of individual $f_1(i, j)$ value and occurrence frequency n/T calculated.

TABLE XIII

| $f_1$ (i, j) | Occurrence number (n) | Occurrence frequency (n/T) |
|--------------|----------------------|----------------------------|
| 4 | 3 | 3/13 |
| 2 | 2 | 2/13 |
| 8 | 2 | 2/13 |
| 0 | 1 | 1/13 |
| 1 | 1 | 1/13 |
| 3 | 1 | 1/13 |
| 5 | 1 | 1/13 |
| 7 | 1 | 1/13 |
| 9 | 1 | 1/13 |
| Total | T = 13 | |

Similarly, TABLE XIV shows an arrangement of $f_2(i, j)$ in order of occurrence number n of individual $f_2(i, j)$ value and occurrence frequency n/T calculated.

TABLE XIV

| $f_2$ (i, j) | Occurrence number (n) | Occurrence frequency (n/T) |
|--------------|----------------------|----------------------------|
| 1 | 7 | 7/13 |
| 0 | 5 | 5/13 |
| 2 | 1 | 1/13 |

The difference values $f_1(i, j)$ are coded by assigning codes of shorter bit length as they have higher occurrence frequency. If the Huffman coding method is employed as means to code them, then the process will be carried out as shown in TABLE XV.

TABLE XV

| f (i, j) | Occurrence frequency | | | | | Code |
|---|---|---|---|---|---|---|
| | | | | | →1 | |
| | | | →4/13─0 | →8/13─0 | | |
| | | | | →5/13─1 | | 1 |
| | | | →4/13─1 | | | |
| 4 | 3/13 | | 3/13─0 | | | 10 |
| | | | →2/13─1 | | | |
| | | →2/13─0 | | | | |
| | | →2/13─1 | | | | |
| 2 | 2/13 | 2/13─0 | | | | 010 |
| 8 | 2/13 | 2/13─1 | | | | 011 |
| 0 | 1/13─0 | | | | | 110 |
| 1 | 1/13─1 | | | | | 111 |
| 3 | 1/13─0 | | | | | 0000 |
| 5 | 1/13─1 | | | | | 0001 |
| 7 | 1/13─0 | | | | | 0010 |
| 9 | 1/13─1 | | | | | 0011 |

Similarly, the difference values $f_2$ (i, j) are coded by assigning codes of shorter bit length as they have higher occurrence frequency as shown in TABLE XVI.

TABLE XVI

| f (i, j) | Occurrence frequency | | | Code |
|---|---|---|---|---|
| | | | →1 | |
| 1 | 7/13 | 7/13─0 | | 0 |
| | | →6/13─1 | | |
| 0 | 5/13─0 | | | 10 |
| 2 | 1/13─1 | | | 11 |

The number of total bits in case of no compression of information content in the picture cell row on the TABLE XI is 13×6 bits (=78 bits), but that in case of compression of information content by one gradation difference values is 6 bits (gradation value of the first picture cell)+2×3+3×2+3×2+3+3+4+4+4+4 (=46 bits), which will be noted from TABLES XIII and XV. This means that the compression ratio is 46/78 (=0.58).

The number of total bits in case of compression of information content by two gradation difference values is 6 bits (gradation value of the first picture cell)+1×7+2×5+2×1 (=25 bits), which will be noted from TABLES XIV and XVI. This means that the compression ratio is 25/78 (=0.32).

Thus, it will be noted that as the information content is compressed by two gradation value, the compression ratio can be extremely hightened.

In the embodiment is described only one scanning line in order to simplify the explanation and since a frame of image has many scanning lines, an arrangement of codes corresponding to $f_n$ (i, j) is extremely elongated. Therefore, if noises or the like enter into the codes during their transmission, the image will not be able to be accurately restored on a signal receiving section. In order to avoid it, a partition code is inserted between the scanning lines when the values $f_n$ (i, j) are converted into codes so that the scanning lines have no error. Furthermore, the gradation value of the first picture cell on every scanning line at its head effectively enters into the codes when the values f (i, j) are converted into codes.

Although some preferred embodiments of the invention have been illustrated and described with reference to the accompanying drawings, it will be understood that they are by way of examples, and that various changes and modifications may be made without departing from the spirit and scope of the invention, which is intended only by the appended claims.

What is claimed is:

1. An apparatus of compressing multilevel image data having picture cells of multilevel gradation values, characterized by comprising;

means to determine difference values between gradation values of adjacent picture cells from the input multilevel gradation image data of a predetermined image component;

means to store said determined difference values sequentially;

means to count an occurrence number of individual difference values from said determined difference values in the image component;

means to arrange said difference values in order of the occurrence frequency and assign codes of smaller bit number as said difference values have higher occurrence frequency whereby codes corresponding to the difference values are prepared;

and means to convert said difference values into codes by sequentially reading out the difference values from said storage means.

* * * * *